April 23, 1929.   A. A. DURANT   1,709,844
INSULATED PIPE
Filed July 12, 1927   2 Sheets-Sheet 1
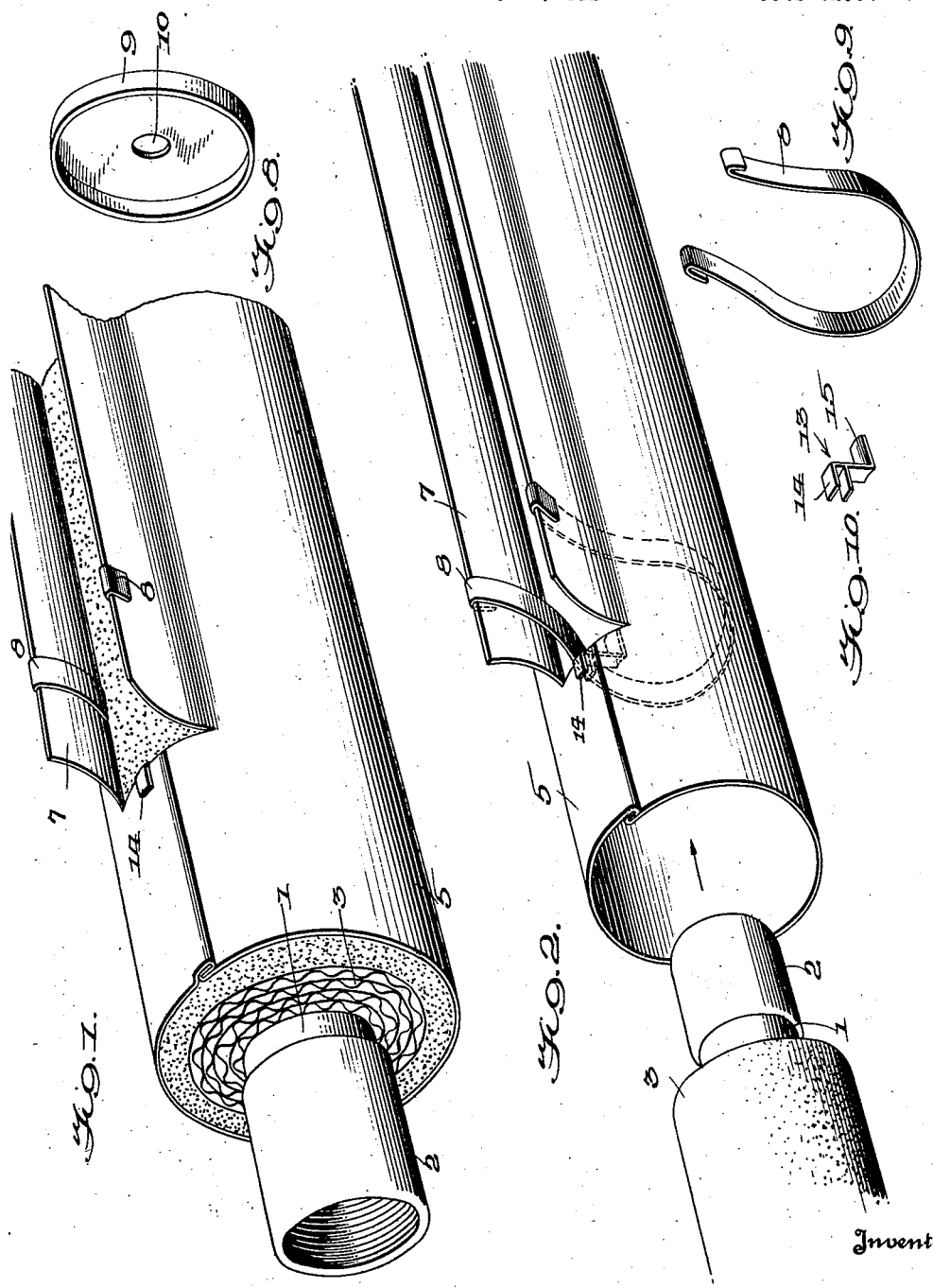

April 23, 1929.  A. A. DURANT  1,709,844
INSULATED PIPE
Filed July 12, 1927   2 Sheets-Sheet 2
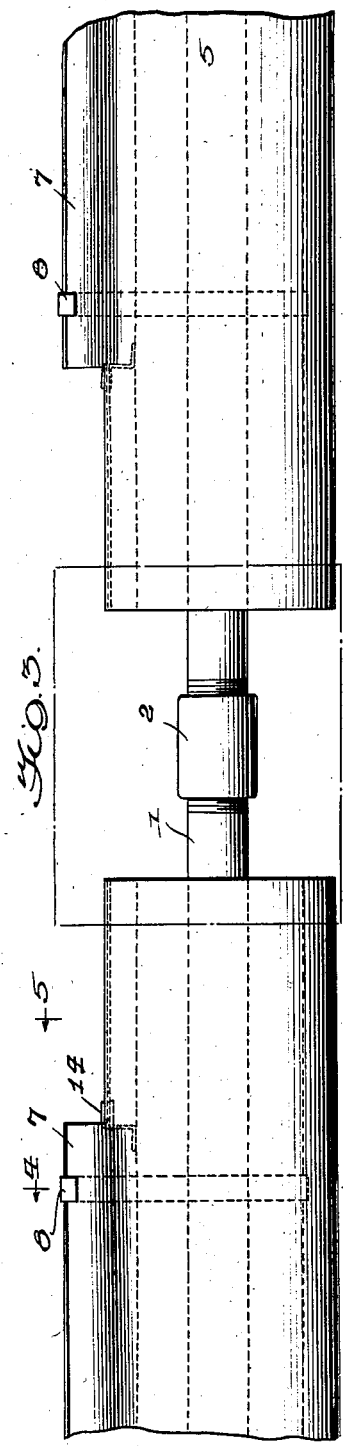
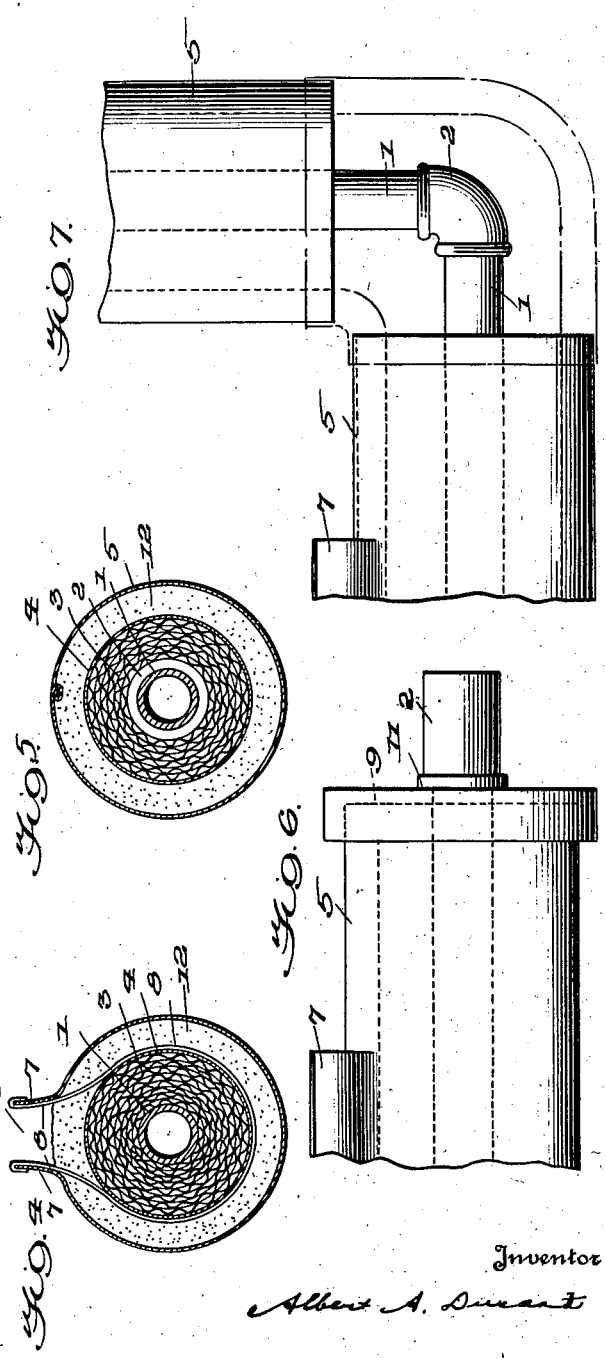
Inventor
Albert A. Durant
By O'Neill & Brian
Attorneys Patented Apr. 23, 1929.

1,709,844

UNITED STATES PATENT OFFICE.

ALBERT A. DURANT, OF HONOLULU, TERRITORY OF HAWAII.

INSULATED PIPE.

Application filed July 12, 1927. Serial No. 205,270.

This invention relates to insulated pipes and methods of applying such insulations, and more particularly to means for and methods of insulating pipes to be laid under ground, and carrying hot or cold liquids or gases to the point where the commodity is to be used. In the conveyance of hot steam or liquids through such a conduit the temperature of the contained commodity of course greatly exceeds the temperature of the earth surrounding the conduit; or the latter may be utilized to convey cool brine, ammonia or other liquids which are at a temperature lower than that of the surrounding earth. In either of the foregoing cases, to prevent the transfer of heat between the pipe containing the commodity, and the earth surrounding the latter, the pipe should be covered with an insulation which is of a character adapted to not only minimize such heat transfer, but to also prevent contact of air with the pipe, thereby eliminating water of condensation, and consequent damage to the pipe insulation.

The object of the present invention is to provide a pipe covering for conduits of the character described, which will not only reduce heat transference to a minimum, but will also prevent access of air to the body of the pipe, thereby preventing the formation of water of condensation.

Another object of the invention is the provision of means which assures that, after the application of the insulating covering, the pipe will be located in a line forming the exact central line of the insulated conduit.

Other objects of the invention will be made apparent in the following specification, when taken in connection with the drawings forming a part thereof, in which like reference numerals indicate like parts throughout the several views.

In said drawings:

Fig. 1 is a perspective view of a portion of a pipe section covered by my insulation.

Fig. 2 is a perspective view showing a section of a pipe partially insulated, preparatory to the final insulating step.

Fig. 3 is a side elevation of portions of two sections of pipe completely insulated, except at the meeting ends of the pipe.

Fig. 4 is a vertical section of the pipe taken on the line 4—4 of Fig. 3.

Fig. 5 is a similar section on the line 5—5 of Fig. 3.

Fig. 6 is a side elevation of an end of a pipe, showing the means for sealing the end while the insulation is being applied around the pipe.

Fig. 7 is a top plan view showing two sections of the pipe coupled at an angle.

Fig. 8 is a perspective view of a closure for the end of a section of the conduit.

Fig. 9 is a perspective view showing the clip used for supporting the pipe section against lateral and downward movement, and, Fig. 10 is a perspective view showing the detent for limiting upward movement of the pipe section.

Now referring specifically to the drawings, 1 indicates a section of the pipe to be used as the conduit for conveying the liquids or gases, to a remote point. For purposes of convenience the pipe 1 is buried under the ground, after being insulated, to ensure the advantages heretofore specified.

It is of course understood that the pipe 1 is formed in sections of certain lengths, the end of each section being provided with screw threads to receive an interiorly screw-threaded collar or connector 2. In the process of treating the pipe sections 1, each section is preliminarily covered with any approved insulating material 3, such as air-cell, wool felt, magnesia or cork chips, only about three inches at each end of the pipe being left bare to permit coupling of one section of the pipe to another section, and to permit inspection of the conduit line when desired. The insulating material 3 may be temporarily retained in position by tapes, if in sheet form, or by canvas tubes 4, if formed of comminuted cork, or may be impregnated with some adhesive which inherently retains the material 3 in position until the next step of the insulating process. It is understood that the numeral 4 indicates the means for temporarily retaining the material 3 in position.

After preparation of several of the pipe sections as above explained, a cylindrical sleeve or mold 5 is slipped over the pipe and insulation, as shown best in Figs. 1 and 2. It is to be understood that the inner diameter of the mold 5 is considerably greater than the outer diameter of the insulating material 3, as illustrated in Figs. 4 and 5. Each mold 5 is preferably formed of oxidized sheet metal, and is provided on its top surface with an elongated opening 6, defined by two upstanding flanges 7, 7. A step in the method of insulation of the pipe 1 consists in covering the latter, and the insulation 3, with a fluent and self-hardening material such as asphalt, and it is therefore important that the pipe 1 be so positioned in the mold 5, that the central longitudinal axis of each are practically in alignment. Various devices may be provided for this purpose, the economical and easy means being here shown as clips 8 adapted to surround the material 3, and equipped with hooked ends adapted to engage the edges of the flanges 7, 7 of the mold. Such clips may easily be so proportioned, with respect to pipes 1 and molds 5 of known diameter, that, when the hooked ends of the clips are engaged on the flanges 7, the longitudinal axis of the pipe 1 will theoretically coincide with that of the mold 5.

With the pipe and mold assembled as above explained, the two open ends of the mold 5 are temporarily sealed to prevent egress from the mold of the soft asphalt during the pouring operation. In sealing the ends of the mold 5, I utilize caps 9, as shown in Figs. 6 and 8, provided with a central aperture 10, adapted to slip over the pipe 1, a washer 11 also passing over the pipe and contacting the cap 9, the coupling member 2 then being screwed onto the end of the pipe 1 and rotated to press the washer against the cap 9, and the latter into close contact with the end periphery of the mold 5. With the elements arranged as above explained the heated asphalt 12 is poured into the opening 6, obviously completely enclosing the material 3 with a layer of asphalt, all points of the outer periphery of the asphalt being substantially equidistant from the outer surface of the pipe 1, and a layer of insulating material lying therebetween.

After the sections are filled with the asphalt 12 and the latter has become set, the caps 9 are removed, and the projecting ends of a pipe 1 are connected to the end of the pipe forming the next section, as illustrated in Fig. 3. Before the connected pipe sections are in the trench, the adjoining ends of the pipes are similarly covered with the material 3, which material is in turn similarly treated with asphalt, as described.

Fig. 7 illustrates an angle in the conduit structure, which may be treated in the same manner by the utilization of a slightly different shape of mold 5, as will be understood.

The clips 8 are formed of non-corrosive material, since they are to be left embedded in the asphalt, and any deterioration thereof might operate to admit air into the space between the asphalt and the material 3, thereby defeating the intent of the exclusion of all air from access to the pipe 1.

After the asphalt has been poured the flanges 7, 7 may be turned downwardly to the full line position shown in Fig. 5, if desired.

From the foregoing it will be apparent that I have produced a pipe conduit which effectually prevents access of air to the pipe carrying the commodity to be guarded against variations in temperature, the asphalt of course constituting a perfect air seal. The sections of the pipe may be insulated at the factory and transported without injury to the point of use, or the insulating work may be as easily carried out at the trench in which the pipe is to be laid. The sheet metal mold or jacket 5 is preferably of non-corrosive material, but it may be made of cheaper material if desired, since, even though it be destroyed by corrosion after installation, the asphalt will retain its position and continue to function as an air seal. Furthermore, on account of the flexibility of the asphalt, no special supports are necessary in the underground work, since ordinary settlements of the ground will not crack the asphalt nor otherwise injure it.

From the foregoing it will be evident that I have provided a pipe covering, and a method of installing the same which effectively excludes outside air from contact with the pipe, and which may be very easily applied thereto, either at the factory or at the trench where the pipe is to be laid.

In certain cases, when sections of relatively small pipes are being treated as herein described, the section has a tendency to float on top of the fluent asphalt and to move out of contact with the clips 8, and, in such position, said sections would obviously be in non-centered position with respect to the asphalt when the latter is properly set. To avoid this difficulty I provide detents 13, in the form of relatively small members of sheet metal, having a bifurcated hooked upper end 14, adapted to embrace the edge of the shell section 5. The lower end of the detent 13 is provided with a presser foot 15, and extends downwardly within the shell to a point such that the pipe section will engage said foot 15 and prevent the rise of said section above the point of centralization with respect to the fluent asphalt. The detents 13 are provided in different sizes dependent upon the size and weight of the pipe section being treated.

I have herein referred to the insulation of pipes to be used in underground work. It is clearly obvious however that the pipes so treated are equally efficacious when used above the ground.

Modifications of the herein described structure will be suggested to those skilled in the art, but my invention covers all embodiments falling fairly within the scope of the appended claims.

I claim:

1. An insulating covering for conduit pipes comprising a layer of porous material surrounding the pipe, a jacket surrounding said material, means contacting said material and connected to said jacket, whereby to position and retain the latter concentrically of the pipe, and a layer of asphalt between said material and said jacket.

2. An insulating covering for conduit pipes comprising a layer of porous material surrounding the pipe, a metallic jacket surrounding said material and spaced therefrom, a member embracing the said material and secured to said jacket, whereby to position the pipe centrally within the latter, and a layer of asphalt between said material and said jacket.

3. An insulating covering for conduit pipes comprising a pipe-enclosing jacket of greater diameter than the pipe and open at each end, an opening in a wall of said jacket adapted to receive fluent asphalt, means secured to said jacket for positioning the pipe therein along the longitudinal axis of the jacket, and means for sealing the ends of the jacket against egress of the asphalt during the pouring operation.

4. An insulating covering for conduit pipes comprising a pipe-enclosing jacket of greater diameter than the pipe, an opening in the top of the jacket adapted to receive fluent asphalt, means secured to the jacket adapted to prevent lateral and downward movement of the pipe while said asphalt is being poured into the jacket, and means for preventing upward movement of said pipe.

5. An insulating covering for conduit pipes comprising a pipe-enclosing jacket adapted to concentrically receive the pipe and having an asphalt receiving opening in its top wall, the wall of the jacket being cut to provide flanges, and a strap member secured to said flanges and embracing said pipe and supporting it centrally of said jacket.

6. An insulating covering for conduit pipes comprising a pipe-enclosing jacket adapted to concentrically receive the pipe and having an asphalt receiving opening in its top wall, the wall of the jacket being cut to provide flanges, a strap member secured to said flanges and embracing said pipe and supporting it centrally of said jacket, and a presser foot secured to the wall of said jacket and extending downwardly for contact with the top of said pipe, whereby to prevent upward movement thereof, substantially as described.

In testimony whereof I affix my signature.

ALBERT A. DURANT.